United States Patent
Achilles et al.

(10) Patent No.: US 10,024,305 B2
(45) Date of Patent: Jul. 17, 2018

(54) SYSTEM AND METHOD FOR STABILIZING A WIND FARM DURING ONE OR MORE CONTINGENCY EVENTS

(71) Applicant: General Electric Company, Schenectady, NY (US)

(72) Inventors: Alfredo Sebastian Achilles, Niskayuna, NY (US); Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 14/937,129

(22) Filed: Nov. 10, 2015

(65) Prior Publication Data

US 2017/0130699 A1  May 11, 2017

(51) Int. Cl.
| | |
|---|---|
| G05F 1/66 | (2006.01) |
| F03D 7/04 | (2006.01) |
| G05B 23/02 | (2006.01) |
| G05B 13/02 | (2006.01) |
| F03D 7/02 | (2006.01) |

(52) U.S. Cl.
CPC ........... *F03D 7/048* (2013.01); *F03D 7/0284* (2013.01); *G05B 13/0205* (2013.01); *G05B 23/0281* (2013.01); *G05F 1/66* (2013.01); *G05B 2219/2619* (2013.01)

(58) Field of Classification Search
None
See application file for complete search history.

(56) References Cited

U.S. PATENT DOCUMENTS

| | | | | |
|---|---|---|---|---|
| 4,289,970 | A * | 9/1981 | Deibert | F03D 7/0224 290/44 |
| 6,429,546 | B1 * | 8/2002 | Ropp | H02J 3/01 307/31 |
| 8,046,109 | B2 | 10/2011 | Larsen et al. | |
| 9,692,319 | B1 * | 6/2017 | Slavin | H02M 7/4807 |
| 2002/0060556 | A1 * | 5/2002 | Wall | H02J 3/38 322/29 |
| 2003/0147191 | A1 * | 8/2003 | Deng | H02J 3/38 361/62 |

(Continued)

*Primary Examiner* — Robert Cassity
*Assistant Examiner* — Gary Collins
(74) *Attorney, Agent, or Firm* — Dority & Manning, P.A.

(57) ABSTRACT

The present disclosure is directed to a system and method for stabilizing disconnection of one or more wind turbines in a wind farm connected to a power grid during one or more grid contingency events. The method includes determining, via one or more processors, a phase-locked loop error signal for each of the wind turbines based on sensor signals from the plurality of wind turbines. The method also includes comparing the phase-locked loop error signal of each wind turbine to at least one predetermined threshold for a predetermined time period. If the phase-locked loop error signal for one or more of the wind turbines comprises a positive value that exceeds the predetermined threshold for the predetermined time period, then the method includes generating a trip signal for the one or more of the wind turbines based on the phase-locked loop error signal, the positive value being indicative of system instability, wherein the trip signal is configured to disconnect the one or more wind turbines from the power grid.

20 Claims, 8 Drawing Sheets

(56) References Cited

U.S. PATENT DOCUMENTS

| | | | |
|---|---|---|---|
| 2004/0008010 A1* | 1/2004 | Ebrahim | H02P 9/04 322/44 |
| 2008/0122293 A1* | 5/2008 | Ohm | H02J 3/383 307/86 |
| 2009/0021082 A1* | 1/2009 | Loucks | H02J 9/08 307/87 |
| 2009/0021877 A1* | 1/2009 | Fornage | H02J 3/383 361/78 |
| 2010/0327585 A1* | 12/2010 | Cao | F03D 7/0272 290/44 |
| 2011/0137474 A1* | 6/2011 | Larsen | F03D 7/0284 700/287 |
| 2012/0013376 A1* | 1/2012 | Thacker | H03L 7/085 327/156 |
| 2012/0147637 A1* | 6/2012 | Petter | H02J 3/24 363/74 |
| 2012/0310426 A1* | 12/2012 | Tarnowski | F03D 7/0272 700/287 |
| 2013/0257049 A1* | 10/2013 | Taylor | H02P 9/006 290/43 |
| 2013/0278308 A1* | 10/2013 | Larsen | H02P 9/00 327/156 |
| 2014/0043080 A1* | 2/2014 | Larsen | H02J 3/46 327/243 |
| 2014/0145508 A1* | 5/2014 | Wagoner | H02J 3/28 307/72 |
| 2014/0175796 A1* | 6/2014 | Rasmussen | F03D 7/028 290/44 |
| 2014/0225457 A1* | 8/2014 | Elliott, II | H02J 3/38 307/125 |
| 2014/0301120 A1* | 10/2014 | Zhu | H02H 7/06 363/49 |
| 2015/0042092 A1* | 2/2015 | Nelson | H02J 3/386 290/44 |
| 2015/0042093 A1* | 2/2015 | Gomis Bellmunt | H02J 3/24 290/44 |
| 2015/0219077 A1* | 8/2015 | Henderson | F03D 7/04 60/459 |
| 2015/0249412 A1* | 9/2015 | Larsen | H02M 5/4585 290/44 |
| 2015/0249416 A1* | 9/2015 | Barker | H02M 5/42 290/44 |
| 2015/0263508 A1* | 9/2015 | Zhu | F03D 17/00 290/44 |
| 2015/0311696 A1* | 10/2015 | Zhu | H02H 7/06 361/21 |
| 2016/0084919 A1* | 3/2016 | Gokaraju | H02H 7/065 702/182 |

\* cited by examiner

SYSTEM AND METHOD FOR STABILIZING A WIND FARM DURING ONE OR MORE CONTINGENCY EVENTS

FIELD OF THE INVENTION

The present invention relates generally to the field of wind turbines, and more particularly, to systems and methods for stabilizing a wind farm having a plurality of wind turbines connected to a power grid during a grid contingency event.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. In many wind turbines, the rotor is attached to the nacelle and is coupled to the generator through the gearbox. The rotor and the gearbox are mounted on a bedplate support frame located within the nacelle. The rotor blades capture kinetic energy of wind using known airfoil principles. Thus, the rotor blades transmit the kinetic energy in the form of rotational energy so as to turn a shaft coupling the rotor blades to a gearbox, or if a gearbox is not used, directly to a generator shaft of the generator. As such, the gearbox may be used to step up the inherently low rotational speed of the turbine rotor for the generator to efficiently convert mechanical energy to electrical energy, which is provided to a power grid. In addition, a plurality of wind turbines in a common geographical location is generally referred to as a wind farm and can be used to generate electricity for the power grid. The individual wind turbines may each have a turbine controller communicatively coupled to a farm controller that provides supervisory control to the wind farm.

During operation of the wind farm, the power grid may suffer from one or more grid contingency events. As used herein, a "grid contingency event" or similar generally refers to any grid event that may cause a sudden, wide area disturbance or power outage. For example, certain grid contingency events are the result of a loss of a transmission line, fault events, and/or generation failures. During such events, the grid is left in a degraded operating mode where the impedance is generally too high to accommodate the power from the energy source, e.g. the wind turbine generators within the wind farm.

In this instance, the physics of the power grid can lead to a phenomenon generally referred to as "pole-slipping." Further, weak grid conditions can be particularly prone to pole-slipping. Pole-slipping, which comes from conventional power generation via synchronous machines, occurs when the rotor angle of the machine moves beyond the point where the restraining torque of the power grid can balance the mechanical input to the wind turbine. The result is an increase in turbine speed. In addition, each time the angle relative to the power grid passes through 360 degrees, a pole of the generator "slips" with respect to the power grid. Thus, pole-slipping can have negative consequences, thereby leading to repetitive voltage depressions and/or severe power pulsations on the power grid and/or one or more of the wind turbines in the wind farm. In addition, with a power electronic interface, a similar situation can occur, but at a faster rate than with conventional power generation and can also include overvoltage conditions.

In view of the aforementioned, uncontrolled disconnections of wind turbine generators and transmissions assets are possible. Thus, improved systems and methods for stabilizing wind turbine disconnection during a contingency event of the power grid would be advantageous. Accordingly, the present disclosure is directed to a system and method that disconnects selected wind turbine generators in a wind farm from the power grid to quickly and effectively stabilize the system such that higher-level controls of the remaining wind turbine generators in the wind farm can bring the system to an acceptable and stable condition.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for stabilizing a wind farm having one or more wind turbines connected to a power grid during one or more grid contingency events. The method includes determining, via one or more processors, a phase-locked loop error signal for each of the wind turbines in the wind farm based on local sensor signals from each of the wind turbines. The method also includes comparing, via the one or more processors, the phase-locked loop error signal of each wind turbine to at least one predetermined threshold for a predetermined time period. If the phase-locked loop error signal for one or more of the wind turbines comprises a positive value that exceeds the predetermined threshold for the predetermined time period, the method also includes generating a trip signal for the one or more of the wind turbines based on the phase-locked loop error signal as the positive value is indicative of system instability. Thus, the trip signal is configured to disconnect the one or more wind turbines from the power grid.

In one embodiment, the method also includes receiving, via the one or more processors, at least one of a terminal power feedback signal or a power command signal from a converter controller of a power converter of one or more of the wind turbines. The terminal power feedback signal generally corresponds to the power coming from one of the wind turbines measured at the terminal thereof. Thus, if the phase-locked loop error signal for one or more of the wind turbines comprises a positive value that exceeds the predetermined threshold for a predetermine time period, the method may also include generating the trip signal for the one or more of the wind turbines based on at least one of the phase-locked loop error signal, the terminal power feedback signal, or the power command signal. In additional embodiments, the method may also include adjusting the predetermined threshold as a function of the terminal power feedback signal. In further embodiments, the method may include utilizing an active power command signal instead of the terminal power feedback signal to adjust the predetermined threshold.

In another embodiment, the method may also include filtering, via one or more filters, at least one of the phase-locked loop error signal, the terminal power feedback signal, or the power command signal. More specifically, in certain embodiments, the filter(s) may include at least one of a notch filter, a low-pass filter, a high-pass filter, or similar or combinations thereof. In further embodiments, the method may include determining whether the filtered phase-locked loop error signal one or more of the wind turbines exceeds the predetermined threshold.

In additional embodiments, the step of generating the trip signal for the one or more wind turbines may include opening a breaker of the one or more wind turbines. In further embodiments, the step of generating the trip signal for the one or more wind turbines may also include initiating a converter trip sequence of a power converter of each of the one or more wind turbines. In certain embodiments, the converter trip sequence is further configured to block or otherwise modify firing commands of the power converter so as to reduce active power output of the wind turbine as the breaker is being opened.

In still another embodiment, the method may include comparing the phase-locked loop error signal of each of the wind turbines to a plurality of thresholds for a plurality of time periods.

In another aspect, the present disclosure is directed to a method for stabilizing a wind farm having one or more wind turbines connected to a power grid during one or more grid contingency events. The method includes receiving, from one or more sensors, one or more voltage feedback signals of the power grid. The method also includes determining, via a phase-locked loop, a phase-locked loop error signal for each of the wind turbines in the wind farm based on the voltage feedback signal. Another step includes comparing the phase-locked loop error signal of each wind turbine to at least one predetermined threshold for a predetermined time period. If the phase-locked loop error signal for one or more of the wind turbines comprises a positive value that exceeds the predetermined threshold for the predetermined time period, the method also includes generating a trip signal for the one or more wind turbines as the positive value is indicative of system instability. Thus, the trip signal is configured to disconnect the one or more wind turbines from the power grid. It should be understood that the method of the present disclosure may be further configured to perform any of the additional method steps as described herein.

In another aspect, the present disclosure is directed to a system for stabilizing a wind farm having one or more wind turbines connected to a power grid during one or more grid contingency events. The system includes one or more sensors configured to measure at least one of voltage, current, temperature, or power and a controller communicatively coupled to the one or more sensors and having one or more processors. The one or more processors are configured to perform one or more operations, including but not limited to determining a phase-locked loop error signal for each of the wind turbines in the wind farm based on local sensor signals from each of the wind turbines, comparing the phase-locked loop error signal of each wind turbine to at least one predetermined threshold for a predetermined time period, and if the phase-locked loop error signal for one or more of the wind turbines comprises a positive value that exceeds the predetermined threshold for the predetermined time period, generating a trip signal for the one or more of the wind turbines based on the phase-locked loop error signal as the positive value is indicative of system instability. Thus, the trip signal is configured to disconnect the one or more wind turbines from the power grid. It should be understood that the system may be further configured with any of the additional features as described herein and may be configured to perform any of the additional method steps as described herein.

Variations and modifications can be made to these exemplary embodiments of the present disclosure. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
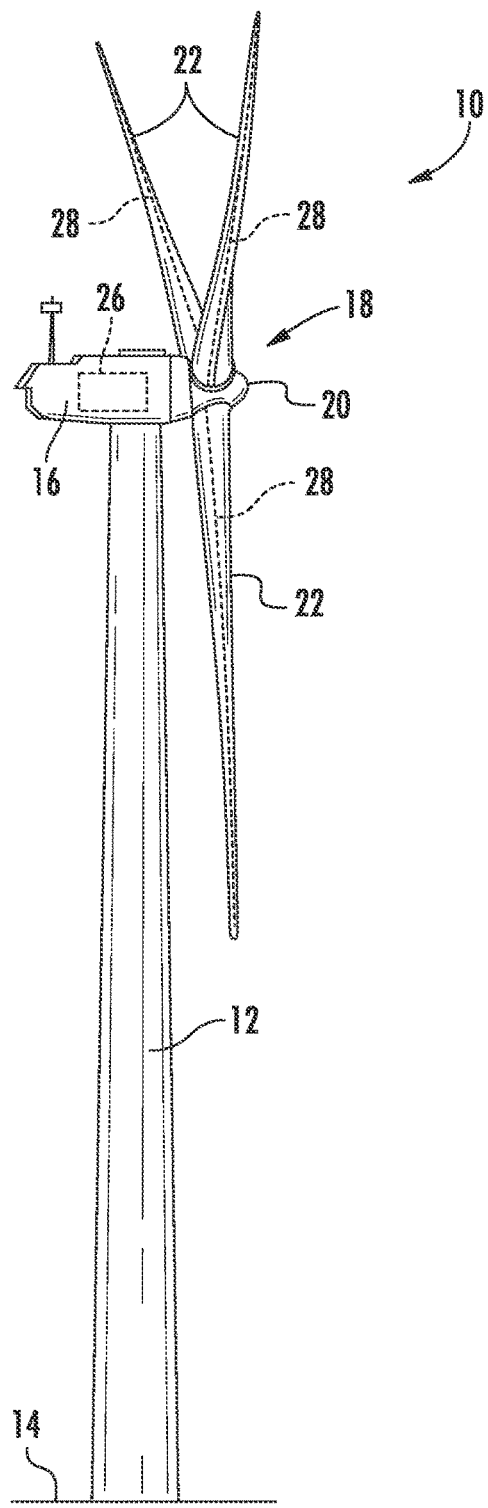
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

Generally, the present disclosure is directed to a system and method for stabilizing a wind farm having one or more wind turbines connected to a power grid during one or more grid contingency events. More specifically, the system is configured to determine a phase-locked loop (PLL) error signal for each of the wind turbines in the wind farm based on sensor measurements from each of the wind turbines and compare the PLL error signal of each wind turbine to at least one predetermined threshold for a predetermined time period. If the PLL error signal for one or more of the wind turbines is a positive value that exceeds the predetermined threshold for the predetermined time period, then the system is configured to generate a trip signal for the one or more wind turbines so as to disconnect the one or more wind turbines from the power grid. By disconnecting a subset of wind turbines from the power grid, the system facilitates the stable operation of the remaining wind turbine generators in the wind farm. Controlling the wind turbine generators in this manner provides many advantages not present in prior art control systems. For example, the present disclosure is configured to increase the amount of wind generation that can be reliably connected to a given utility system. In other words, the present disclosure is configured to reduce the transmissions infrastructure required to operate wind farms. Further, the present disclosure allows for stable operation of at least part of the wind farm during weak grid conditions.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced. The generators are sometimes, but not always, rotationally coupled to the rotor 18 through a gearbox. Thus, where applicable, the gearbox is configured to step up the inherently low rotational speed of the rotor for the generator to efficiently convert the rotational mechanical energy to electric energy. Gearless direct drive wind turbines also exist. The generated electric power is transmitted to an electric grid 184 (FIG. 2) via at least one electrical connection. As such, known wind turbines may be coupled to the electric grid 184 via a known full power conversion assembly 162 (FIG. 2).

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, control various components of the wind turbine 10, and/or implement the various method steps as described herein.

Figure 2:
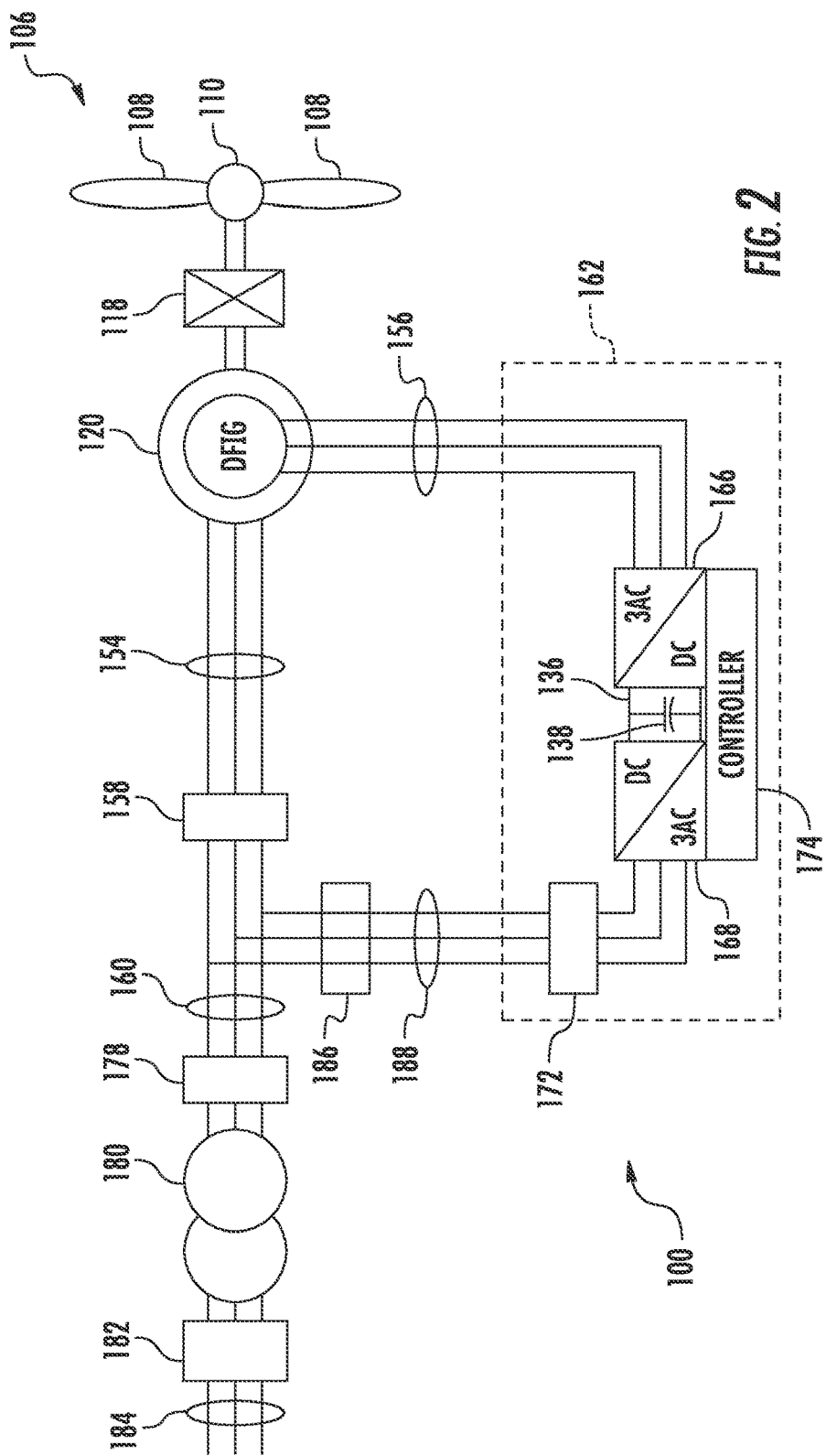
FIG. 2 illustrates a schematic diagram of one embodiment of a control and electrical system of a wind turbine according to the present disclosure.

Referring now to FIG. 2, a schematic diagram of one embodiment of an electrical and control system 100 for the wind turbine 10 is illustrated. As shown, a rotor 106 includes a plurality of rotor blades 108 coupled to a rotating hub 110, and together define a propeller. The propeller is coupled to an optional gearbox 118, which is, in turn, coupled to a generator 120. In accordance with present disclosure, the generator 120 may be a doubly-fed generator 120 (DFG). The DFG 120 is typically coupled to a stator bus 154 and a power conversion assembly 162 via a rotor bus 156. The stator bus 154 provides output of three-phase power from a stator (not separately illustrated) of the DFG 120 and the rotor bus 156 provides output of three-phase power from a rotor (not separately illustrated) of the DFG 120. With particular reference to the power conversion assembly 162, the DFG 120 is coupled via the rotor bus 156 to a rotor-side converter 166. The rotor-side converter 166 is coupled to a line-side converter 168 which in turn is coupled to line-side bus 188. In exemplary configurations, the rotor-side converter 166 and the line-side converter 168 are configured for a normal operating mode in a three-phase, two-level, Pulse Width Modulation (PWM) arrangement using Insulated Gate Bipolar Transistor (IGBT) switching devices. The rotor-side converter 166 and the line-side converter 168 are coupled via a DC link 136 across which is the DC link capacitor 138.

In typical configurations, various line contactors and circuit breakers including, for example, grid breaker 182, may be included to isolate the various components as necessary for normal operation of the DFG 120 during connection to and disconnection from power grid 184. A system circuit breaker 178 couples the system bus 160 to transformer 180, which is connected to power grid 184 via grid breaker 182. In addition, various circuit breakers and switches within the wind turbine system 100, including grid breaker 182, system breaker 178, stator sync switch 158, converter breaker 186, and line contactor 172 are configured to connect or disconnect corresponding buses, for example, when current flow is excessive and can damage the components of the wind turbine system 100 or for other operational considerations. Additional protection components (not shown) may also be provided.

In operation, power generated at the DFG 120 by the rotating rotor 106 is provided via a dual path to a power grid 184. The dual paths are defined by the stator bus 154 and the rotor bus 156. On the rotor bus 156 side, sinusoidal three-phase a-c power is converted to direct current (DC) power by the power conversion assembly 162. The converted power from the power conversion assembly 162 is combined with the power from the stator of the DFG 120 to provide three-phase power having a frequency that is maintained substantially constant, e.g. at a 60-Hz a-c level. The power conversion assembly 162 compensates or adjusts the frequency of the three-phase power from the rotor of the DFG 120 for changes.

The power conversion assembly 162 may also include a controller 174 to control the operation of the rotor-side converter 166 and the line-side converter 168. It should be noted that the controller 174, in typical embodiments, is configured as an interface between the power conversion assembly 162 and the controller 26 of the wind turbine 10. In additional embodiments, the power conversion assembly 162 is configured to receive control signals from, for example, the controller 26 via the controller 174. The control signals are based, among other things, on sensed conditions or operating characteristics of the wind turbine system 100. Typically, the control signals provide for control of the operation of the power conversion assembly 162. For example, feedback in the form of sensed speed of the DFG 120 may be used to control the conversion of the output power from the rotor bus 156 to maintain a proper and balanced three-phase power supply. Other feedback from other sensors also may be used by the controller 26 to control the power conversion assembly 162, including, for example, stator and rotor bus voltages and current feedbacks. Using the various forms of feedback information, and for example, switching control signals, stator synchronizing switch control signals and system circuit breaker control (trip) signals may be generated in any known manner.

Figure 3:
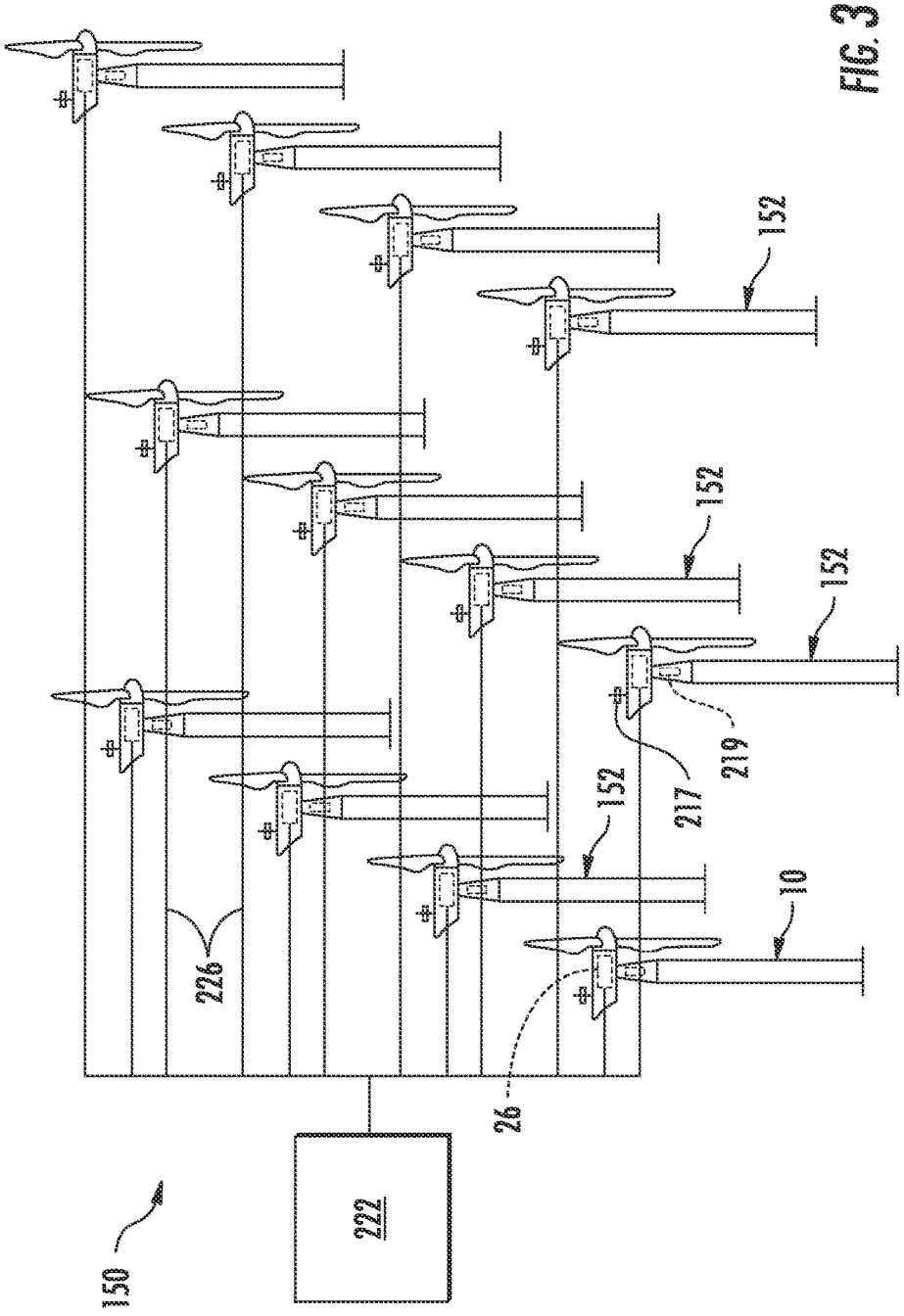
FIG. 3 illustrates a schematic view of one embodiment of a wind farm according to the present disclosure.

Referring now to FIG. 3, a schematic view of one embodiment of a wind farm 150 that may be controlled according to the present disclosure is illustrated. More specifically, as shown, the wind farm 150 may include a plurality of wind turbines 152, including the wind turbine 10 described above, and a farm controller 222. For example, as shown in the illustrated embodiment, the wind farm 150 includes twelve wind turbines, including wind turbine 10. However, in other embodiments, the wind farm 150 may include any other number of wind turbines 152, such as less than twelve wind turbines or greater than twelve wind turbines. In one embodiment, the individual turbine controller 26 of the wind turbine 10 may be communicatively coupled to the farm controller 222 through a wired connection, such as by connecting the controller 26 through suitable communicative links 154 (e.g., a suitable cable). Alternatively, the controller 26 may be communicatively coupled to the farm controller 222 through a wireless connection, such as by using any suitable wireless communications protocol known in the art. In addition, the farm controller 222 may be generally configured similar to the turbine controllers 26 for each of the individual wind turbines 152 within the wind farm 150.

In several embodiments, one or more of the wind turbines 152 in the wind farm 150 may include a plurality of sensors for monitoring various operating data points or control settings of the individual wind turbines 152 and/or one or more wind parameters of the wind farm 150. For example, as shown, each of the wind turbines 152 includes a wind sensor 217, such as an anemometer or any other suitable device, configured for measuring wind speeds or any other wind parameter. In one embodiment, the wind parameters may include information regarding at least one of or a combination of the following: a wind gust, a wind speed, a wind direction, a wind acceleration, a wind turbulence, a wind shear, a wind veer, a wake, SCADA information, or similar. In addition, the wind turbine(s) 152 may also include one or more additional sensors 219. For instance, the additional sensor(s) 219 may be configured to monitor electrical properties of the output of the generator of each wind turbine 152, such as current sensors, voltage sensors, temperature sensors, or power sensors that monitor power output directly based on current and voltage measurements. Alternatively, the sensors 217, 219 may include any other sensors that may be utilized to monitor the power output of a wind turbine 152. It should also be understood that the wind turbines 152 in the wind farm 150 may include any other suitable sensor known in the art for measuring and/or monitoring wind parameters and/or wind turbine operating data points.

Figure 4:
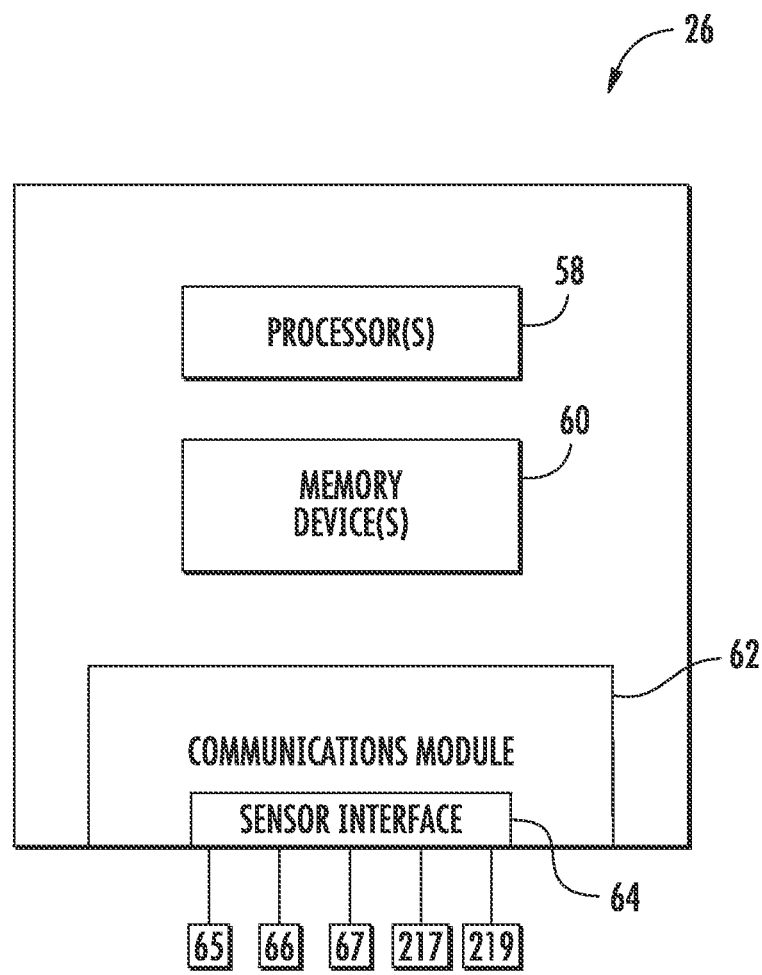
FIG. 4 illustrates a block diagram of one embodiment of suitable components of a controller of a wind turbine (or a wind farm) according to the present disclosure.

Referring now to FIG. 4, a block diagram of one embodiment of suitable components that may be included within the controller 26 (or controllers 174, 222) is illustrated in accordance with aspects of the present subject matter. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Further, the controller 26 may also include a communications module 62 to facilitate communications between the controller 26 and the various components of the wind turbine system 100. For instance, the communications module 62 may include a sensor interface 64 (e.g., one or more analog-to-digital converters) to permit the signals transmitted by one or more sensors 65, 66, 67, 217, 219 to be converted into signals that can be understood and processed by the controller 26. It should be appreciated that the sensors 65, 66, 67, 217, 219 may be communicatively coupled to the communications module 62 using any suitable means. For example, as shown in FIG. 4, the sensors 65, 66, 67, 217, 219 are coupled to the sensor interface 62 via a wired connection. However, in other embodiments, the sensors 65, 66, 67, 217, 219 may be coupled to the sensor interface 64 via a wireless connection, such as by using any suitable wireless communications protocol known in the art. As such, the processor 58 may be configured to receive one or more signals from the sensors 65, 66, 67, 217, 219.

The sensors 65, 66, 67, 217, 219 of the wind turbine system 100 may be any suitable sensors configured to measure any operating or loading condition at or near the wind turbine. For example, the sensors may include blade sensors for measuring a pitch angle of one of the rotor blades 108 or for measuring a loading acting on one of the rotor blades 108; generator sensors for monitoring the generator (e.g. torque, rotational speed, acceleration and/or the power output); and/or various wind sensors for measuring various wind parameters. In addition, the sensors 65, 66, 67, 217, 219 may be located near the ground of the wind turbine, on the nacelle, or on a meteorological mast of the wind turbine. It should also be understood that any number or type of sensors may be employed and at any location. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Figure 5:
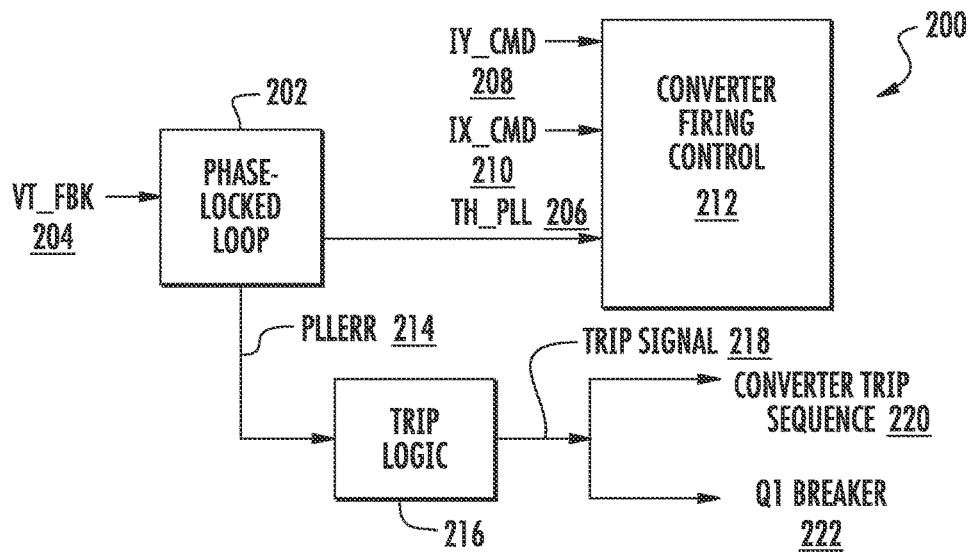
FIG. 5 illustrates a schematic diagram of one embodiment of a wind turbine generator control scheme that may be implemented by one or more of the controllers according to the present disclosure.
Figure 6:
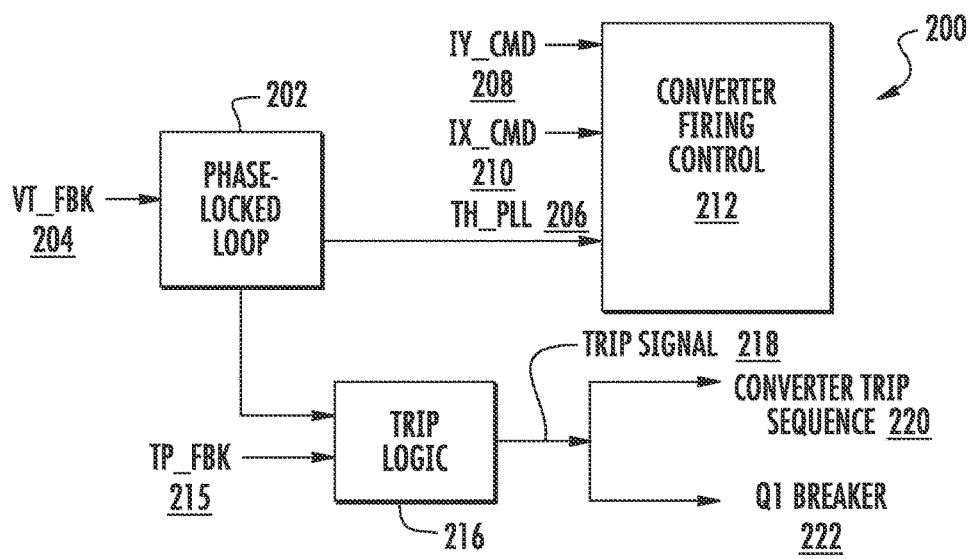
FIG. 6 illustrates a schematic diagram of another embodiment of a wind turbine generator control scheme that may be implemented by one or more of the controllers according to the present disclosure.

Referring now to FIGS. 5 and 6, schematic views of various embodiments of a wind turbine generator control scheme 200 that may be implemented by one or more of the controllers 26, 174, 222 are illustrated. For example, as shown, the control scheme 200 includes a phase-locked loop (PLL) regulator 202. A phase-locked loop regulator as used herein generally refers to a control system that generates an output signal having a phase related to a phase of an input signal. For example, as shown, the PLL regulator 202 is configured to receive a terminal voltage feedback signal, i.e. VT_FBK 204. More specifically, the PLL regulator 202 may receive the terminal voltage feedback signal 204 from one or more sensors 65, 66, 67, 217, 219. Further, the PLL regulator 202 generates a PLL error signal for the wind turbine 10, i.e. PLLERR 214, and a PLL phase angle signal, i.e. TH_PLL 206. Moreover, as shown, the PLL phase angle signal 206 is transmitted to the converter firing control 212 for control of the power conversion assembly 162 of the wind turbine 10 and for subsequent control of electrical currents injected onto utility grid 184. In addition, as shown, the converter firing control 212 may also receive a real current command signal 210, i.e. IX_CMD 210, and a reactive current command 208, i.e. IY_CMD 208, for control of the power conversion assembly 162 and for subsequent control of electrical currents injected onto utility grid 184. It should also be understood that the PLL regulator 202 may be included within the controllers 26, 174, 222, or may be coupled to, but separate from, the system controller 26, 174, 222. Further, as shown, the PLL error signal 214 can be sent to a trip logic control 216, which is further described below with reference to FIG. 7. In addition, as shown in FIGS. 5 and 6, the trip logic control 216 is configured to generate a trip signal 218 that initiates a wind turbine generator breaker operation, e.g. Q1 breaker command 222, and/or a converter trip sequence 220. More specifically, the trip signal 218 may be configured to open a breaker, e.g. grid breaker 182, of the wind turbine 10 and/or initiate a converter trip sequence 220 for the wind turbine or both. In another embodiment, the converter trip sequence 220 may be configured to request the power converter 162 to block firing or otherwise rapidly modify firing commands so as to reduce the active power output of the wind turbine 10. Thus, the trip sequence 220 is configured to reduce the power output of the wind turbine 10 when the grid breaker 182 is being opened based on the signal 222.

Figure 7:
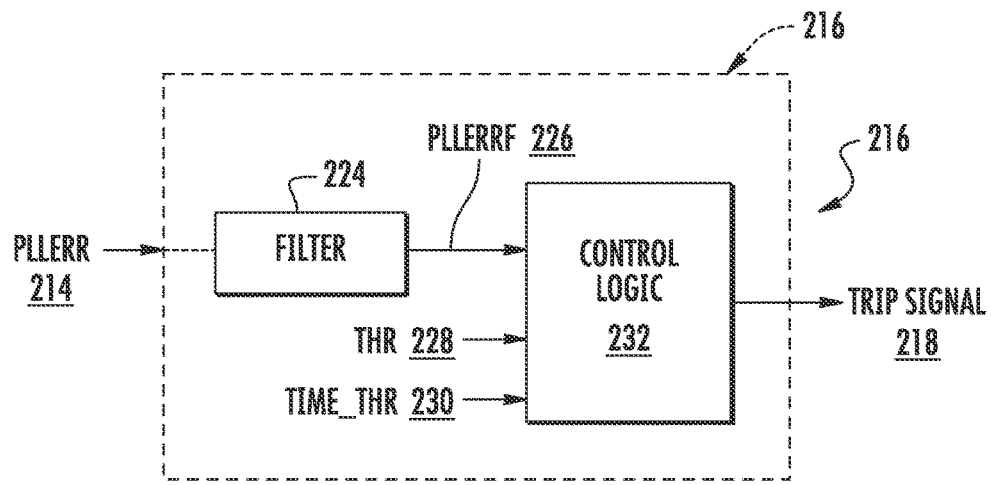
FIG. 7 illustrates a schematic diagram of one embodiment of a trip logic control of a wind turbine generator control scheme that may be implemented by one or more of the controllers according to the present disclosure.
Figure 8:
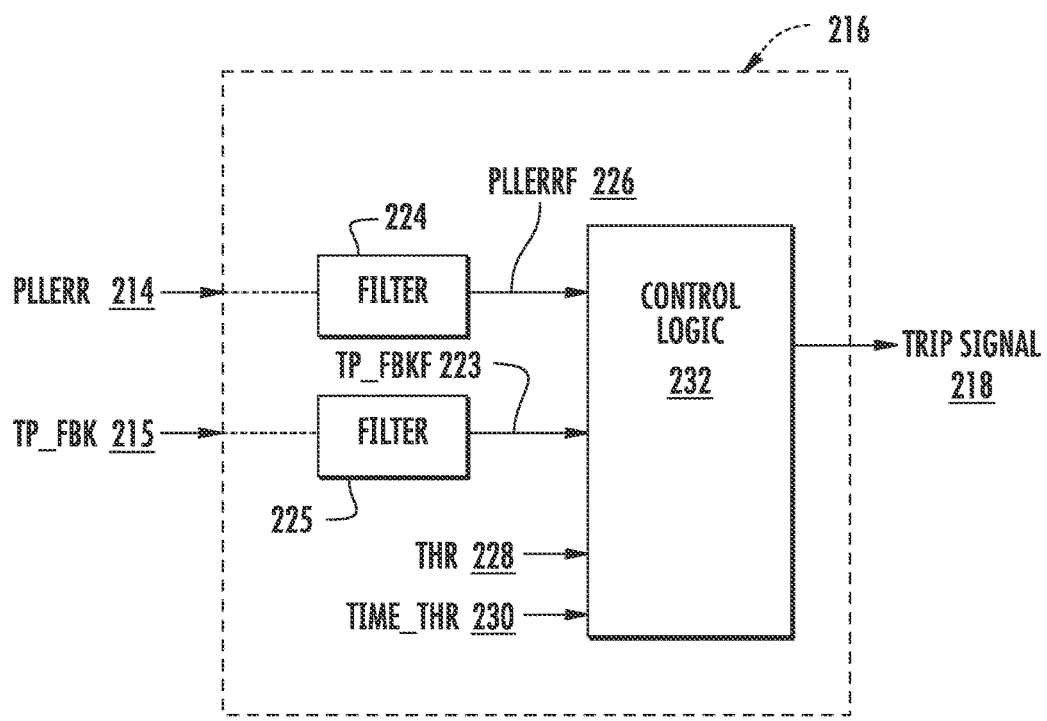
FIG. 8 illustrates a schematic diagram of another embodiment of a trip logic control of a wind turbine generator control scheme that may be implemented by one or more of the controllers according to the present disclosure.

Referring now to FIGS. 7 and 8, schematic views of various embodiments of the trip logic control 216 according to the present disclosure are illustrated. Thus, the trip logic control 216 is configured to disconnect pre-selected wind turbine generators from the power grid 184 to facilitate the stable operation of the other wind turbine generators in the wind farm 150. For example, as shown in FIGS. 5 and 7, the trip logic control 216 of each wind turbine 152 may include a disconnection logic configured to receive, at least, a phase-locked loop (PLL) error signal 214. In additional embodiments, as shown in FIGS. 6 and 8, the trip logic control 216 is also configured to receive a terminal power feedback signal, i.e. TP_FBK 215. As used herein, the terminal power feedback signal 215 generally corresponds to the power coming from one of the wind turbines 152 measured at the terminal thereof. Thus, the trip logic control 216 of each wind turbine 152 is configured to generate a disconnection instruction, e.g. the trip signal 218, based on the PLL error signal 214, the terminal power feedback signal 215, or both. In additional embodiments, the trip logic control 216 may be configured to adjust the predetermined threshold as a function of the terminal power feedback signal 215. In additional embodiments, the trip logic control 216 may be configured to block the trip signal 218 for predetermined terminal power feedback signal 215 levels.

More specifically, as shown in FIGS. 7 and 8, the PLL error signal 214 of each wind turbine 152 and/or the terminal power feedback signal 215 may be filtered via one or more filters 224, 225 so as to reduce nuisance operations associated with fast transients not associated to system stability. The filter(s) 224, 225 as described herein may be any suitable filters known in the art. More specifically, in certain embodiments, the filter(s) 224, 225 may include notch filters, low-pass filters, high-pass filters, band-stop filters, band-rejection filters, or similar or any combinations thereof. A band-stop or band-rejection filter generally refers to a filter that passes most frequencies unaltered, but attenuates signals in a specific range to very low levels. As such, band-stop filters are the opposite of band-pass filters which pass frequencies within a certain range and rejects (attenuates) frequencies outside that range. More specifically, the filter(s) 224, 225 may be notch filters which are band-stop filters with a narrow stopband (i.e. a high Q factor). In still additional embodiments, the filter(s) 224, 225 may include band-pass filters which are a combination of low-pass and high-pass filters. Thus, in particular embodiments, the filter(s) 224, 225 may include a low-pass filter followed by a high-pass filter in series. A low-pass filter generally refers to a filter that passes signals with a frequency lower than a certain cutoff frequency and attenuates signals with frequencies higher than the cutoff frequency. The amount of attenuation for each frequency depends on the filter design. A low-pass filter is the opposite of a high-pass filter, which is a filter that passes signals with a frequency higher than a certain cutoff frequency and attenuates signals with frequencies lower than the cutoff frequency. In further embodiments, the filter(s) 224, 225 may include rolling average filters.

Still referring to FIGS. 7 and 8, the filtered PLL error signal (i.e. PLLEFFF 226) of each wind turbine 152 can then be compared to a threshold, i.e. THR 228, via a control logic 232 or algorithm. In further embodiments, the filtered PLL error 226 signal of each wind turbine 152 may be compared with a plurality of thresholds, e.g. using several definite-time functions and/or time-dependent characteristics. If the threshold 228 of one or more of the wind turbines 152 is exceeded for more than a specified time (e.g. TIME_THR 230), then the trip signal 218 for that wind turbine(s) 152 is enabled. Otherwise, the wind turbine(s) 152 continues operating in its normal operating mode. In addition, the control logic 232 may be configured to generate the trip signal 218 based on the filtered terminal power feedback signal 223.

Thus, in certain embodiments, the wind turbine generator disconnection is only allowed when the filtered PLL error signal 226 exceeds the predetermined threshold 228 in the direction associated with system instabilities (i.e. the positive direction). In additional embodiments, the comparison of the filtered PLL signal 226 to the threshold THR 228 considers the sign of the error that is relevant for system stability, as PLL errors with the opposite sign are typically not an indication of system instability. Thus, PLL error signals with opposite direction (sign) typically do not result in wind turbine generator disconnection. In certain embodiments, the threshold and/or the predetermined or specified time period may be determined based on an evaluation and/or detailed study of the wind farm 150. For example, various operating parameters and/or layout conditions of the wind farm 150 may be evaluated to determine an appropriate threshold(s) and/or the predetermined time period. Such parameters and/or conditions may include the farm layout, wind turbine characteristics, wind turbine operating parameters (e.g. speed, pitch angle, torque, etc.), historical operating data, size of the wind farm 150, size and/or manufacturer of the wind turbines 152, location of the farm 150, etc. Thus, the processor(s) 58 may be configured to model or simulate the wind farm 150 so as to determine the appropriate threshold(s) and/or the predetermined time period.

In additional embodiments, as shown, the PLL regulator 202 that is used by the converter firing control 212 is also used to generate the PLL_ERR 214. In alternative embodiments, however, a PLL function different from that used in the converter firing control 212 may be used to generate the PLL error. In such an embodiment, the separate PLL function allows for a different PLL bandwidth to be selected.

Figure 9:
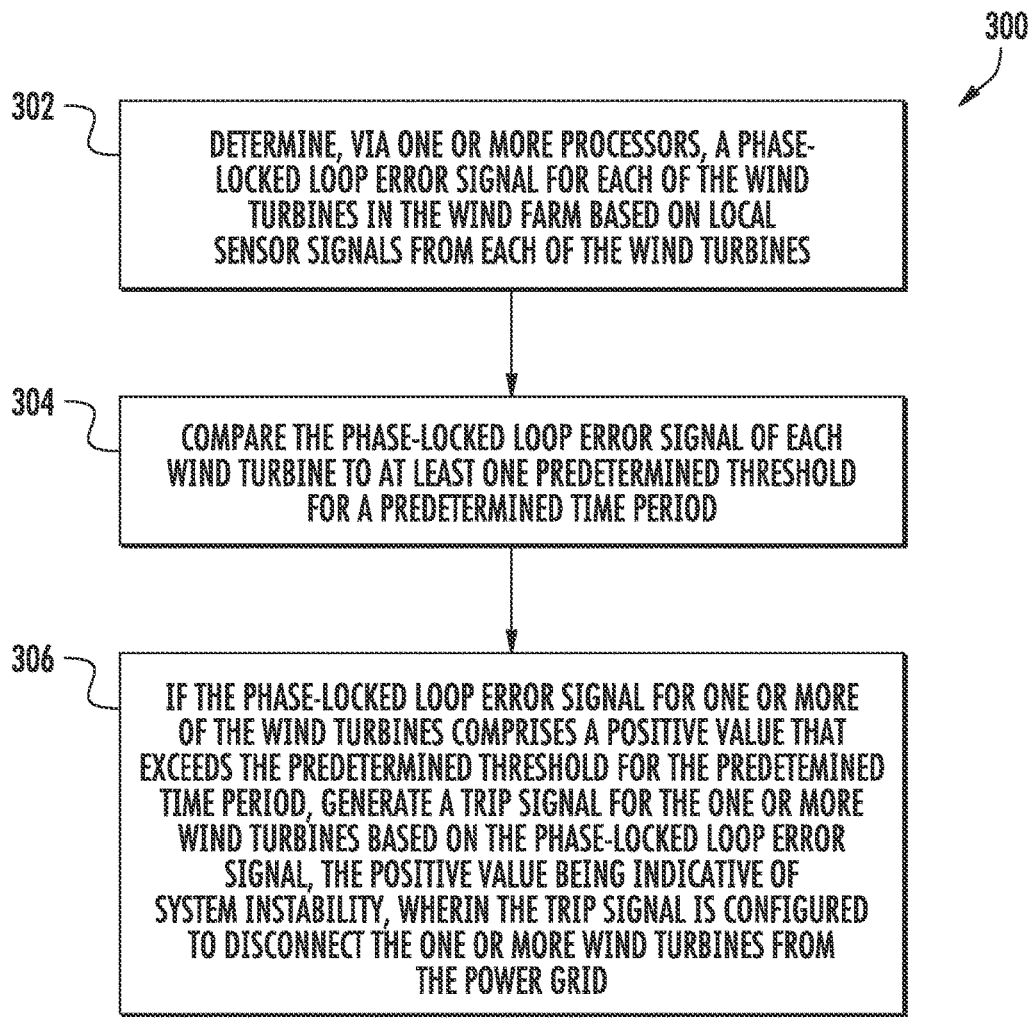
FIG. 9 illustrates a flow diagram of one embodiment a method for stabilizing a wind farm having one or more wind turbines connected to a power grid during one or more grid contingency events; and, FIG. 10 illustrates a flow diagram of another embodiment method for stabilizing a wind farm having one or more wind turbines connected to a power grid during one or more grid contingency events.

Referring now to FIG. 9, a flow diagram of a method 300 for stabilizing a wind farm 150 having one or more wind turbines 152 connected to a power grid 184 during one or more grid contingency events is illustrated. As shown at 302, the method 300 includes determining, via one or more processors, a phase-locked loop error signal for each of the wind turbines 152 in the wind farm based on local sensor signals from the plurality of wind turbines 152. As shown at 304, the method 300 includes comparing, via the one or more processors, the phase-locked loop error signal of each wind turbine 152 to at least one predetermined threshold for a predetermined time period. As shown at 306, if the phase-locked loop error signal for one or more of the wind turbines 152 comprises a positive value that exceeds the predetermined threshold for the predetermined time period, the method 300 also includes generating a trip signal for the one or more of the wind turbines, e.g. a subset of wind turbines 152 within the wind farm 150, based on at least one of the phase-locked loop error signal, wherein the trip signal is configured to disconnect the one or more wind turbines 152 from the power grid 184.

In certain embodiments, the subset of wind turbines 152 may be determined based on an evaluation of the wind farm 150. For example, various operating parameters and/or layout conditions of the wind farm 150 may be evaluated to determine which subset of wind turbines 152 should be shut down during a grid contingency event. Such parameters and/or conditions may include the farm layout, wind turbine characteristics, wind turbine operating parameters (e.g. speed, pitch angle, torque, etc.), historical operating data, size of the wind farm 150, size and/or manufacturer of the wind turbines 152, location of the farm 150, etc. Thus, the processor(s) 58 may be configured to model or simulate the wind farm 150 so as to determine the subset of wind turbines 152 that should be tripped.

Figure 10:
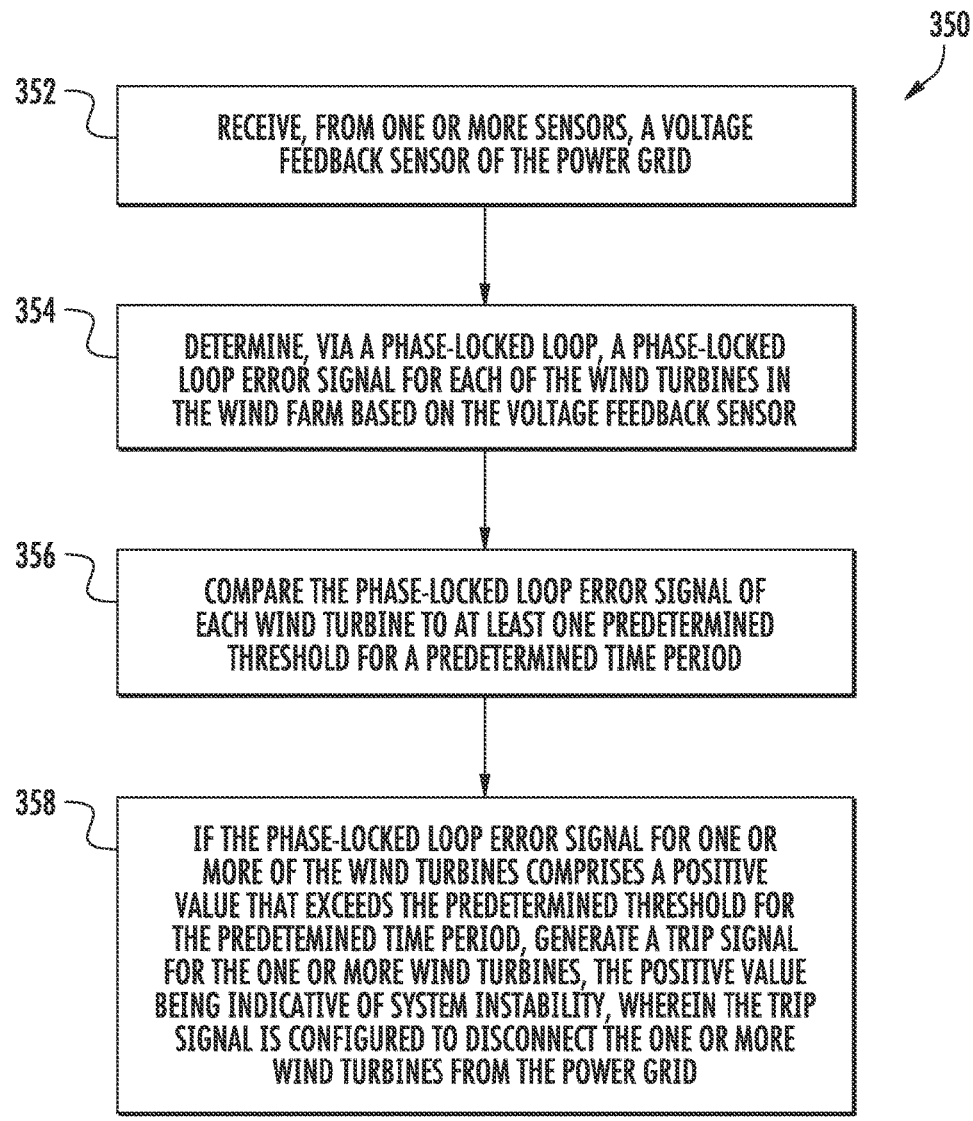

Referring now to FIG. 10, a flow diagram of another embodiment of a method 350 for stabilizing a wind farm 150 having one or more wind turbines 152 connected to a power grid 184 during one or more grid contingency events is illustrated. As shown at 352, the method 350 includes receiving, from one or more sensors, one or more voltage feedback signals of the power grid 184. As shown at 354, the method 350 also includes determining, via a phase-locked loop, a phase-locked loop error signal for each of the wind turbines 152 in the wind farm 150 based on the voltage feedback signal(s). As shown at 356, the method 350 includes comparing the phase-locked loop error signal of each wind turbine 152 to at least one predetermined threshold for a predetermined time period. As shown at 358, the method 350, if the phase-locked loop error signal for one or more of the wind turbines 152 comprises a positive value that exceeds the predetermined threshold for the predetermined time period, the method 350 includes generating a trip signal for the one or more wind turbines 152, wherein the trip signal is configured to disconnect the one or more wind turbines 152 from the power grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for stabilizing a wind farm having one or more wind turbines connected to a power grid during one or more grid contingency events, the method comprising
   determining, via one or more processors, a phase-locked loop error signal for each of the wind turbines in the wind farm based on local sensor signals from each of the wind turbines;
   comparing, via the one or more processors, the phase-locked loop error signal of each wind turbine to at least one predetermined threshold for a predetermined time period; and,
   if the phase-locked loop error signal for one or more of the wind turbines comprises a positive value that exceeds the predetermined threshold for the predetermined time period, generating a trip signal for only the wind turbines having a phase-locked loop error signal with a positive value, the positive value being indicative of system instability,
   wherein the trip signal is configured to disconnect only the wind turbines having a phase-locked loop error signal with a positive value from the power grid and wind turbines having a phase-locked loop error signal with a negative value stay connected to the power grid.

2. The method of claim 1, further comprising receiving, via the one or more processors, a terminal power feedback signal or a power command signal from a converter controller of a power converter of one or more of the wind turbines.

3. The method of claim 2, further comprising, if the phase-locked loop error signal for one or more of the wind turbines comprises a positive value that exceeds the predetermined threshold for the predetermined time period, generating the trip signal for one or more of the wind turbines based on the phase-locked loop error signal and at least one of the terminal power feedback signal or the power command signal.

4. The method of claim 2, further comprising adjusting the predetermined threshold as a function of the terminal power feedback signal.

5. The method of claim 1, further comprising filtering, via one or more filters, at least one of the phase-locked loop error signal, the terminal power feedback signal, or the power command signal.

6. The method of claim 5, further comprising determining whether the filtered phase-locked loop error signal exceeds the predetermined threshold for each of the wind turbines.

7. The method of claim 5, wherein the one or more filters comprise at least one of a notch filter, a low-pass filter, a high-pass filter, or combinations thereof.

8. The method of claim 1, wherein generating the trip signal for the one or more of the wind turbines further comprises:
   opening a breaker of each of the one or more wind turbines.

9. The method of claim 8, wherein generating the trip signal for the one or more of the wind turbines further comprises:

initiating a converter trip sequence of a power converter of each of the one or more wind turbines.

10. The method of claim 9, wherein the converter trip sequence is further configured to block or modify firing commands of the power converter so as to reduce active power output of the wind turbine as the breaker is being opened.

11. The method of claim 1, further comprising comparing the phase-locked loop error signal to a plurality of thresholds for a plurality of time periods.

12. A method for stabilizing a wind farm having one or more wind turbines connected to a power grid during one or more grid contingency events, the method comprising:
   receiving, from one or more sensors, one or more voltage feedback signals of the power grid;
   determining, via a phase-locked loop, a phase-locked loop error signal for each of the wind turbines in the wind farm based on the voltage feedback signal;
   comparing the phase-locked loop error signal of each wind turbine to at least one predetermined threshold for a predetermined time period;
   if the phase-locked loop error signal for one or snore of the wind turbines comprises a positive value that exceeds the predetermined threshold for the predetermined time period, generating a trip signal for only the wind turbines having a phase-locked loop error signal with a positive value, the positive value being indicative of system instability,
   wherein the trip signal is configured to disconnect only the wind turbines having a phase-locked loop error signal with a positive value from the power grid and wind turbines having a phase-locked loop error signal with a negative value stay connected to the power grid.

13. A system for stabilizing a wind farm having one or more wind turbines connected to a power grid during one or more grid contingency events, the system comprising:
   one or more sensors configured to measure at least one of voltage, current, temperature, or power;
   a controller communicatively coupled to the one or more sensors, the controller comprising one or more processors configured to perform one or more operations, the one or more operations comprising
      determining a phase-locked loop error signal for each of the wind turbines in the wind farm based on local sensor signals from each of the wind turbines,
      comparing the phase-locked loop error signal of each wind turbine to at least one predetermined threshold for a predetermined time period, and
      if the phase-locked loop error signal for one or more of the wind turbines comprises a positive value that exceeds the predetermined threshold for the predetermined time period, generating a trip signal for only the wind turbines having a phase-locked loop error signal with a positive value, the positive value being indicative of system instability,
   wherein the trip signal is configured to disconnect only the wind turbines having a phase-locked loop error signal with a positive value from the power grid and wind turbines having a phase-locked loop error signal with a negative value stay connected to the power grid.

14. The system of claim 13, wherein the one or more operations further comprise receiving, via the one or more processors, at least one of a terminal power feedback signal or a power command signal from a converter controller of a power converter of one or more of the wind turbines.

15. The system of claim 14, wherein the one or more operations further comprise, if the phase-locked loop error signal for one or more of the wind turbines comprises a positive value that exceeds the predetermined threshold for the predetermined time period, generating the trip signal for one or more of the wind turbines based on the phase-locked loop error signal and at least one of the terminal power feedback signal or the power command signal.

16. The system of claim 14, wherein the one or more operations further comprise adjusting the predetermined threshold as a function of the terminal power feedback signal.

17. The system of claim 13, further comprising one or more filters configured to filter at least one of the phase-locked loop error signal, the terminal power feedback signal, or the power command signal, wherein the one or more filters comprise at least one of a notch filter, a low-pass filter, a high-pass filter, or combinations thereof.

18. The system of claim 17, wherein the one or more operations further comprise determining whether the filtered phase-locked loop error signal exceeds the predetermined threshold for each of the wind turbines.

19. The system of claim 13, wherein generating the trip signal for the one or more of the wind turbines further comprises:
   opening a breaker of each of the one or more wind turbines.

20. The system of claim 13, wherein generating the trip signal for the one or more of the wind turbines further comprises:
   initiating a converter trip sequence of a power converter of each of the one or more wind turbines.

* * * * *